United States Patent

Stabler

[11] 4,054,269
[45] Oct. 18, 1977

[54] FENCE POSTS

[76] Inventor: Karl Stabler, Kurnbacher Str. 2, D-7131 Sternenfels, Germany

[21] Appl. No.: 718,374

[22] Filed: Aug. 27, 1976

[30] Foreign Application Priority Data

Sept. 9, 1975 Germany .............................. 2540157

[51] Int. Cl.² .......................................... E04H 17/00
[52] U.S. Cl. ..................................... 256/48; 403/347; 403/387
[58] Field of Search ....................... 256/49, 48, 50, 52; 403/346, 347, 387

[56] References Cited

U.S. PATENT DOCUMENTS

| 196,337 | 10/1877 | Crocker et al. | 256/48 UX |
| 319,877 | 6/1885 | Bayliss | 256/49 UX |
| 866,048 | 9/1907 | McAtlin | 256/48 UX |
| 1,848,452 | 3/1932 | Young | 256/57 |

FOREIGN PATENT DOCUMENTS 1,352,736  1/1964  France ................................... 256/49

*Primary Examiner*—Andrew V. Kundrat

[57] ABSTRACT

A post, pole or the like for wire picket fences is formed of a pipe like section having on its surface at least one projecting web pointing radially away from it and extending axially along part of its entire length. The web is provided with radially open grooves in which wires or similar fencing objects can be fastened. A retaining member slidably engaging the web is movable over the wire to retain the same.

6 Claims, 4 Drawing Figures

FENCE POSTS

BACKGROUND OF THE INVENTION

The present invention relates to the construction of posts, poles or standards upon which fences are built and supported.

Posts have been in use for a multitude of applications amongst which are their use as vine props having prop wires, and posts for wire fences and especially posts for use in coral fencings having multiple wire strands or chicken wire-like running portions.

As far as these known types of posts for the aforementioned applications are concerned, a notable trend is discernable to depart from the conventional wooden post in favor of a post manufactured from plastic material. While such plastic posts have an essentially longer service life, they entail the problem of how to affix the necessary fencing wires to it. Various ways have been tried to facilitate the affixing of single wires, ropes, etc. on plastic posts or to basically find a proper way of doing so.

Thus it has been known to affix the tension wires of vine props by the use of tensioning bands which are wound around the pole, fixing the wire between the pole and the tensioning band. A wedge can be used as a closure for the tensioning band which wedge is introduced into tensioning orifices formed on the ends of the tensioning bands.

It has been demonstrated that this type of means for affixing the wires not only is very time consuming but it also does not afford a positive grip of the wire on the post. It has happended time and again that the tension of the tensioning band changes under the influence of the weather and under changing grip of the tensioning wires itself. The tensioning band eventually slides down the length of the post, so that the point of affixing the fencing wire is dislodged and changed.

In the quest for a simpler means for affixing the tensioning wires, a post has become known having on its surface a weg extending in longitudinal direction, projecting away from the surface, and extending at least over part of the entire length of the pole. The web is formed with recesses in which wires or similar objects can be affixed. These posts have been formed as plastic hollow profile pole or pipe sections; the webs forming an integral part of the post, and have a thickness not greater than the wall thickness of the hollow profile section. Longitudinal slots are punched in the webs which have an opening designed for the introduction of the wires and in which the wire may be hung.

The slots for the accomodation of the wires require a relatively wide web which, because of its inherently insignificant strength, may easily break off. In fact, there is the danger that parts of the web may break off, even while the slots are being punched. This danger of breakage is further increased during use of the post in forming the fence, because the wire introduced into said slots in subject to great tensile forces, and is not positively held in place within the slot. Furthermore, if the wire comes to rest near the introductory opening of the slot, it may be pulled out of the latter because of the tensile force acting on the wire, or if parts of a web have broken off near the opening of a slot, there is no further possibility of securely introducing or maintaining wire in the slots. If several slots along part of the web are broken, the entire post will become useless.

It is the object of the present invention, to provide an improved post of the afore-mentioned type in such a way as to significantly increase the number of wire receptacle slots without increasing the danger of breakage near said slots, and to eliminate any breakage of parts of the web even during fabrication and to assure that the wire introduced into aforesaid slot is positively held and will not disengage from said slot even under tensile forces of a considerable magnitude.

These objects, other objects and various advantages of the present invention will be seen from the foregoing disclosure of the present invention.

SUMMARY OF THE PRESENT INVENTION

According to the present invention a post, pole, stake or the like is provided comprising a pipe like section having on its surface two or more longitudinally extending webs of defined cross section, on which are formed one or more radially open grooves each for the reception of a wire. A retaining member having a slot conforming to the web and adapted to slide axially thereon is provided which is provided with means for covering the groove and retain the wire thereon.

In the aforesaid embodiment, the width of the web may thus be kept much narrower than heretofore, so that any breakage of parts of the web will be practically eliminated. The grooves which form receptacles for the wire can be punched more easily without there being any danger of breakage. Preferably, the receptacle groove will, in the longitudinal direction, have small dimensions, so that essentially a greater number of them can be provided, without impairing the strength and rigidity of the guide web in any way. This arrangement, as far as the actual use of the post is concerned, affords an essentially greater freedom in affixing the fence wires. The separate retaining slides will hold the wires positively in the grooves, against any of the forces placed on the wires and only a regulating movement applied to the slide may open the hitherto covered groove and permit the taking out of the wire affixed therein. The aforesaid actuation of the slide, however, cannot be transmitted by the affixed wire onto the slide.

According to one embodiment, the dimensioning of the grooves is such that the width as well as the depth of the grooves in the guide web will at least correspond to the diameter of the wire, or other fence material to be inserted therein.

The positive fastening of the slides on the guide web is achieved by forming the cross-section of the guide web, T-shaped, and the slides having a conforming T-shaped slot to match the guide webs. The arrangement of the guide webs is such that the stem projects radially outward from the surface of the post and the transversely arranged end T-arms extend in a direction parallel to a tangent to the surface of the pipe forming the post.

Affixation of the wire in the receptacle groove, according to one embodiment, is achieved by attaching as an integral part to the slotted guide member of the slide a plate-shaped covering member designed to cover the outside surface of the end T-arms of the webs. A certain positive arresting connection between the wire thus affixed and the slide which has been slidably mounted on the guide web is achieved by providing the cover part of the slide with notches extending at least over part of the lateral surfaces of the end arms of the guide webs. Introducing the slides into, or sliding it over, the guide web is done in such a way that the slide is introduced from the top of the post, onto the guide web, by means of its guide member which passes the wire introduced into a receptacle groove in the guide web and snaps back over the end arms, thus covering the receptacle groove and the wire from its exterior. In this manner, the slide, because of its own weight, holds itself firmly in closed position.

The pipe and guide webs are preferably formed of plastic material by conventional extrusion or molding processes. The slide itself can also be cheaply manufactured as a plastic molding.

Full details of the present invention are set forth in the following description and are shown in the accompanying drawings.

DESCRIPTION OF THE INVENTION

Figure 1:
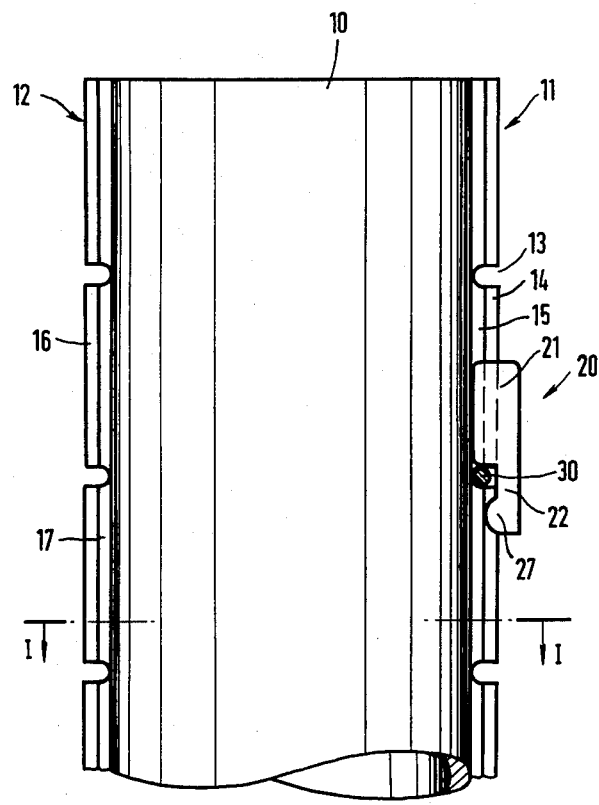
FIG. 1 is a longitudinal section of a post in a lateral view whereby one wire has been positively inserted in the receptacle slot of a guide web and fixed by means of a retaining slide.
Figure 2:
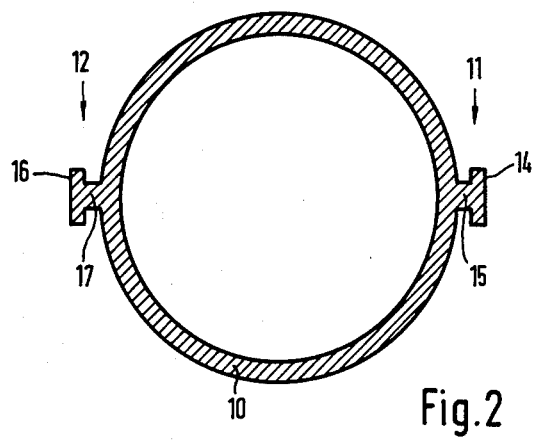
FIG. 2 is a cross sectional view of the post according to FIG. 1, taken along line I — I.

In FIGS. 1 and 2, a post is shown formed of a hollow-profile pipe 10 of a circular cross-section, on the surface of which two guide webs 11 and 12 are integrally attached. The guide webs 11 and 12 extend in a longitudinal direction relative to the axis of the pipe. Preferably the pipe 10 and webs 11 and 12 are formed in one integral piece of plastic material by an extrusion process. The post and webs may be formed separately and adhered together to form a unitary post. Rather than extrusion, the members may be molded or otherwise formed.

The guide webs 11 and 12 have a T-shaped flanged cross-section in which the stems 15 and 17 radially project from the pipe section and have transverse end arms 14 and 16. The arms 14 and 16 extend in tangential to the surface of the pipe and form an undercut permitting are retaining slide 20 to be slide therealong without any danger of falling off.

At regular intervals, wire receptacle grooves 13 are cut into each of the guide webs 11 and 12 which open towards the radially outer sides of guide webs. In some instances short sections only of webs 11, 12 may be formed and only one or more grooves provided. The grooves 13, as far as width and depth is concerned, are chosen to conform to the outer-diameter of the wire to be affixed therein. Thus, the width or height of the guide webs 11 and 12 from the surface of the post can be kept very narrow. This will provide the advantage of significantly reducing the likelihood of any breakage of the guide webs 11 and 12, especially in the area of the grooves 13.

Figure 3:
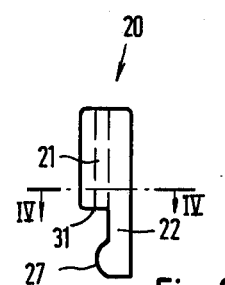
FIG. 3 is a side view of the retaining slide.
Figure 4:
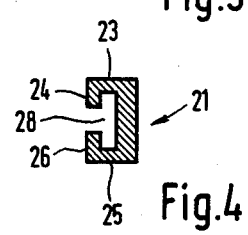
FIG. 4 is a section through the guide member of the slide along line IV — IV of FIG. 3.

As shown in FIGS. 3 and 4, the slide 20 is generally rectangular in cross section and its upper end is formed as a guide member 21 with a T-shaped hollow interior slot 28 conforming to the cross-section or profile of the guide webs 11 and 12. The slot 28 is formed by the sides 23, 25 and back portion of the slide 24, 26, so that slide 20 is positively guided on the guide webs 11 and 12, in a cooperatively engaging manner such as a bayonet type fastening. The back portions 24, 26 are preferably spaced from each other a distance equal to that of the width of the stem of the flange 11, 12. At the lower edge of the guide member 21 there is integrally formed a flat plate shaped cover member 22. The cover member 22 is provided with winglike side edges 27 which closes and covers the outside edges of the T-arms 14 or 16, respectively, and thus act to close the grooves 13 and wire 30 that might be placed therein.

If, as demonstrated in FIG. 1, the slide 20 with cover member 22 pointing downward, is introduced from above onto the guide web 11 or 12, its longitudinal downward movement will be terminated the moment the frontal edges 31 of the guide member 21 engages the wire 30 introduced into a receptacle 13. As a result, the cover member 22 closes off the groove 13 and locks the wire 30 therein. Consequently, even if tensile forces act on the wire, only a component of force in a direction perpendicular to the longitudinal direction of the guide web 11 or 12, will act on the cover part 22, which, however, will not be able to move the slide 20 upwardly. The upward and downward components of the tensile forces will be spent against the edge of the receptacle grooves 13. Thus, the slide 20 positively fixes the wire 30 to the post. The tensile forces acting on the wire 30 are absorbed via the guide web 11 or 12, respectively and the guide member 21 of the slide 20. The guide member 21 of the slide 20 may be manufactured in sufficient length to afford a specially great contact surface at the guide web 11 or 12, respectively without any difficulty.

Any loosening of the slide 20 from the locked position is made more difficult by providing the wing like side edges 27 with notches extending in part over the lateral surfaces of the T-arms 14 or 16, of the guide web 11 or 12, respectively. These notches may be pushed and shaped onto the T-arms 14, 16, upon pushing the slide 20 over the introduced wire 30. They may if necessary be lifted over the wire 30 and subsequently snapped back into positive below the wire 30 when adjustment, for example to the wire itself is made. In this manner, also any unintentional lifting of the slide 20 as well as longitudinal movement is eliminated and the slide 20 can only be moved from its closing position by positive application of force. The latter will have to be done only when the connection between pipe 10 and wire 30 is to be separated.

Any breakage of the guide web 11 and 13 in the area of the receptacle grooves 13 in this new type of positive fastening is practically eliminated since guide webs 11 and 12 are subjected to longitudinal forces only which, in addition, may be of a very insignificant magnitude.

Various modifications, changes and embodiments have been suggested, others may be obvious to those skilled in the art. This disclosure is therefore to be taken as illustrative of the present invention and not limiting thereof.

What is claimed is:

1. Apparatus for supporting a wire for the construction of picket fences and the like comprising a cylindrical post, at least one longitudinal extending guide web formed on the exterior surface of said post, at least one radially open groove formed in said web for receiving a wire, and retaining member slidably mounted on said web having an extended portion adapted to engage over said groove and enclose the wire therein, said guide webs having a T-shaped cross-section having a stem projecting radially from the surface of said post and transversely directed end arms extending in a direction parallel to a tangent to the surface of said post and the retaining member comprises a slide member having a T-shaped guide groove conforming to the guide webs.

2. The apparatus according to claim 1, wherein the width and the depth of the groove corresponds to at least the outside diameter of the wire.

3. The apparatus according to claim 1, wherein the retaining member is formed of plastic material.

4. The apparatus according to claim 1, wherein said post is formed of plastic material.

5. The apparatus according to claim 1, including a plate-shaped closure member integrally attached to the slide member adapted to extend over said groove and enclosing the outside of the T-shaped arm.

6. The apparatus according to claim 5, wherein the closure member is notched and extends at least in part in engagement over the lateral surfaces of the T-shaped arms.

* * * * *